United States Patent [19]

Biessener

[11] 3,824,930

[45] July 23, 1974

[54] TOW LINE TRUCK AND BRAKE SYSTEM

[75] Inventor: Richard M. Biessener, Faribault, Minn.

[73] Assignee: Nutting Truck and Caster Company, Faribault, Minn.

[22] Filed: July 13, 1973

[21] Appl. No.: 378,910

[52] U.S. Cl. .................................. 104/172 BT
[51] Int. Cl. ................................... B65g 17/42
[58] Field of Search .............. 104/172 R, 172 BT

[56] References Cited
UNITED STATES PATENTS

| | | | |
|---|---|---|---|
| 3,436,994 | 4/1969 | Diener et al. | 188/82.84 |
| 3,528,534 | 9/1970 | Benson et al. | 188/82.84 |
| 3,589,301 | 6/1971 | Reagan | 104/172 BT |

*Primary Examiner*—M. Henson Wood, Jr.
*Assistant Examiner*—Richard A. Bertsch
*Attorney, Agent, or Firm*—Dorsey, Marquart, Windhorst, West & Halladay

[57] ABSTRACT

An improved truck for tow line use is provided with a brake system designed to stop the truck in response to engagement of a front bumper against an obstacle, while minimizing the force applied by the truck and bumper to the obstacle. The truck includes a brake member having a bottom floor-engageable surface and an upper wheel-engageable surface. A longitudinally movable brake support member on the truck supports the brake member in front of at least one wheel for relative movement between a retracted position ahead of the wheel and a braking position in which the brake member is engaged beneath the wheel. The brake support member is mounted on the truck by low-friction ball or roller bearings, to further insure operation of the brake system with minimal application of force against an obstacle. The front bumper is movably mounted on the brake support member for movement from a rest position to an active control position by engagement with the obstacle. Movement of the front bumper to active position controls an anti-back-up device, in the form of a one-way clutch and brake interconnecting the truck body and brake support member, which permits forward movement of the truck body and wheel onto the brake member with a resulting cessation of forward motion due to the action of the brake member and weight of the truck, rather than the resistance of the obstacle. The anti-back-up device also prevents premature rearward movement of the wheel and truck body from the brake support member. The anti-back-up device is released forcibly by return movement of the front bumper to its rest position. Improved tow pin lifting and rear bumper features are also shown, including a specially latched, resiliently held bumper.

10 Claims, 6 Drawing Figures

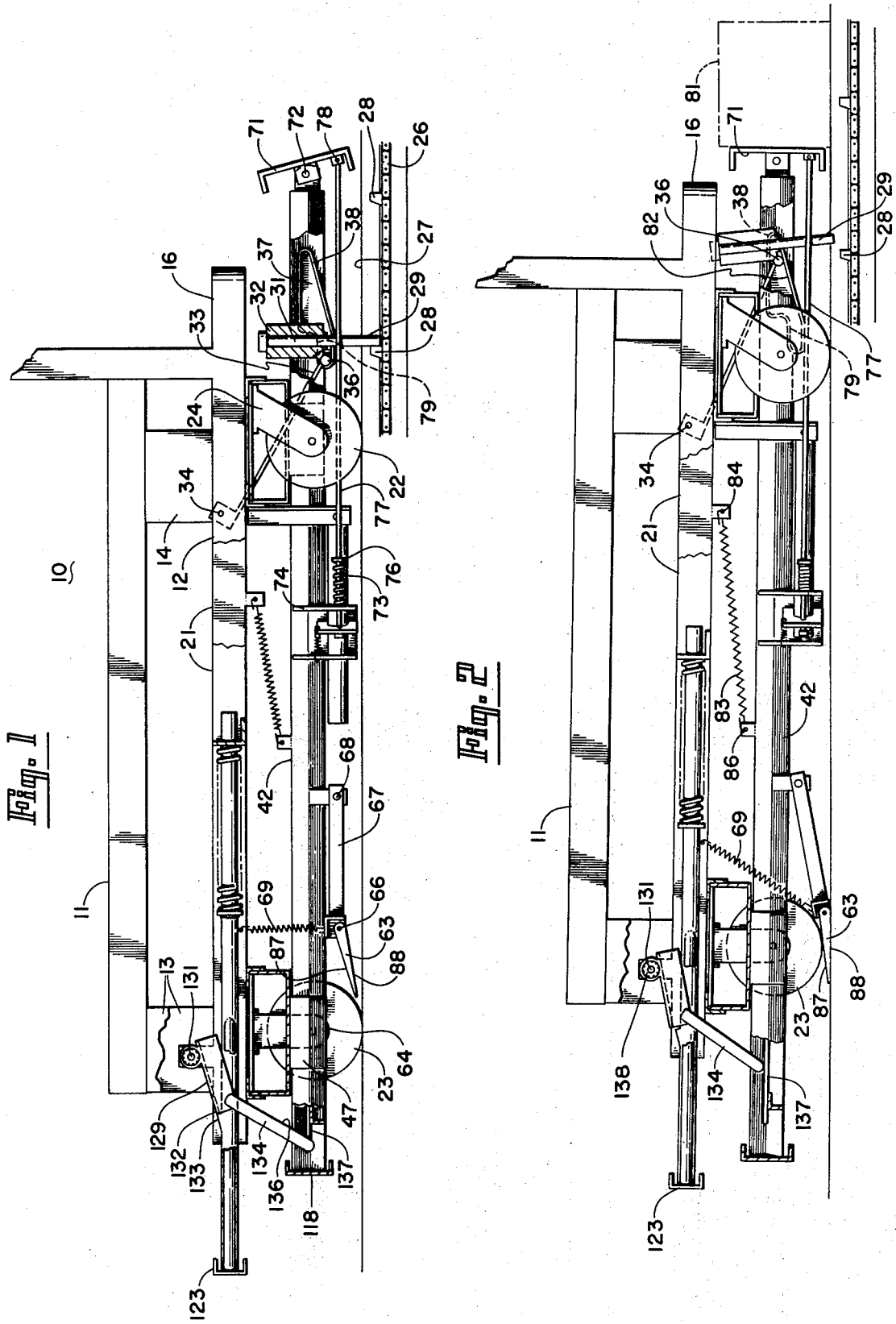

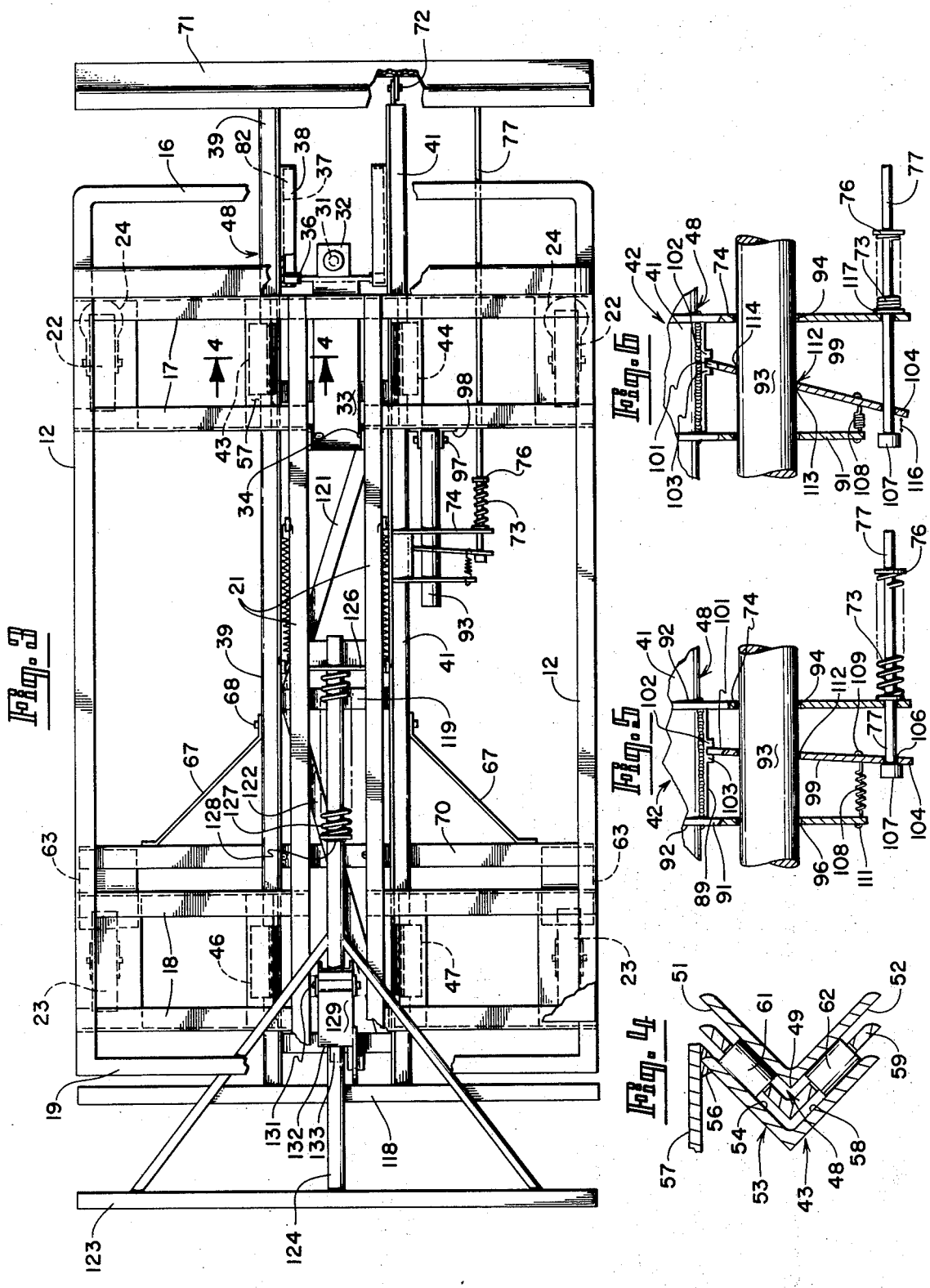

TOW LINE TRUCK AND BRAKE SYSTEM

CROSS REFERENCE TO RELATED APPLICATION

This application describes and claims certain features and improvements suitable for use in combination with the system described and claimed in my earlier United States Patent application Ser. No. 222,799 filed Feb. 2, 1972 and entitled "Tow Line Truck and Brake System."

BACKGROUND OF THE INVENTION

As described in my prior copending application Ser. No. 222,799 mentioned above, tow line conveyor trucks were previously known in which a movable front bumper was designed to engage an obstacle or another truck ahead of the truck in question for movement of such front bumper to a position in which it effectively disengaged the truck from driving connection with the usual tow line conveyor. When such a tow pin was disengaged, however, the momentum of the truck tended to continue its forward movement against the obstacle, with resulting possibilities of severe damage, depending on the nature of the obstacle. Some of the prior constructions also provided brake members adapted to engage one or more of the wheels of such a truck in an effort to stop the truck more effectively. Truck constructions had also been provided in which various arrangements of fixed and/or movable bumper members at various points on such a truck were designed to insure disengagement of the tow pin of a following truck when it encountered a leading truck which had been halted by an obstacle, but in which the tow pin of the following truck remained in engagement with a driving conveyor when there was no obstacle in front of the leading truck, and the engagement of the two trucks was designed merely to push the leading truck out of the main conveyor path and onto a suitable shunt or auxiliary conveyor line. As noted, however, the forces transmitted to an obstacle, before such a system of trucks could be brought to a halt, were very substantial. Also, known tow line truck brake constructions which relied primarily on resilient or camming engagement of a movable brake member with the periphery of the truck wheel tended to be inadequate to insure complete stopping of the truck without substantial overrunning of the obstacle. The frictional braking forces available for stopping such a truck were limited by the force with which the brake member could be applied to the wheel and by the coefficient of friction between the wheel periphery and either the brake member or the floor. Moreover, the braking force was applied largely by the object struck.

The invention described in my prior copending application accordingly provided an effective truck and brake system in which the momentum of the truck was used to apply the brakes by permitting substantial relative longitudinal movement between a front bumper, which first engaged an obstacle, and the main body portion, wheels and load of the truck itself. In effect, the obstacle could stop the bumper and a light brake support assembly in a shorter distance than it could stop a heavily loaded truck body. Continuing movement of the truck was designed to operate the brake system before the forward portion of the truck itself had reached the obstacle or applied heavy forces to it.

Moreover, the weight of the truck and its load were utilized to dissipate the energy of movement of the truck by providing a preferred form of brake member having a braking position beneath a truck wheel, so that the truck wheel had to move up onto the top of the brake member and firmly engage the brake member between the truck wheel and the floor on which the truck was adapted to move. Thus the frictional forces applied between the wheel, brake member and floor were proportional to the vertical force applied by the weight of the truck and load. Moreover, by providing a forwardly and upwardly inclined brake member, onto which the truck wheel had to run, the resulting vertical movement of the wheel, truck and load contributed to a more effective dissipation of the energy of forward movement of the truck and tended to stop the truck in a shorter distance, i.e., before the truck itself actually reached the obstacle which had been engaged initially by the movable front bumper.

Even with the constructional features and combinations described in the earlier application Ser. No. 222,779, however, experimental tests in some cases showed that forces greater than 35 lbs. might be applied against an obstacle to disengage the tow pin and operate the braking system effectively. Also, in some cases, the specific anti-back-up device of that application did not hold the parts as securely in braked position as might be desirable. Thus, there is a continuing need for improved systems of this general type.

SUMMARY OF THE INVENTION

The present invention accordingly provides an improved tow line conveyor truck and brake system in which the application of possible forces to an obstacle engaged by the truck is minimized by a combination of features including the provision of a truck body having front and rear supporting wheels for engagement with a supporting floor, a tow pin for driven engagement by a tow line conveyor to move the truck across the floor along a path defined by such a conveyor, a brake support member in the form of an assembly extending generally longitudinally of the truck body in a direction corresponding to the path of movement of the truck, a front bumper member mounted at the front of the brake support member for engagement by an obstacle in front of the truck, and an "anti-friction" bearing construction supporting the brake support member on the truck body for relative longitudinal movement by bearing members having respective bearing portions fixed to the truck body and brake support member and with intermediate rotatable friction-reducing bearings, such as ball or roller bearing members, between the respective bearing portions on the truck body and brake support member, thereby supporting the opposite edges of the brake support member in a manner freely permitting relative longitudinal movement of the brake support member and truck body between a forward brake support member position in which the front bumper projects ahead of the truck body, and a rear brake support member position in which the front bumper has engaged an obstacle with minimal force and thereby stopped the forward movement of the brake support member. Said brake support member further carries at least one brake member which is thereby moved into a relative rearward braking position in which a truck wheel rolls up onto the brake member and is separated from the floor with all of that part of the truck weight carried by that particular wheel pressing the brake member against the floor. The combination further includes an interconnection between the tow pin of such a truck, the truck body and the brake support member for moving the tow pin to a non-driving position in response to initial relative movement of the truck and wheel toward the brake member, or in combination with an anti-back-up device preventing premature relative movement of the wheel and truck longitudinally off the brake member, until the anti-back-up device is released by movement of the front bumper at the front end of the brake support member from an active position into which it has been swung by engagement with an obstacle, back to a rest position to which it can return on removal of such obstacle.

The present invention also includes an improved anti-back-up device which directly locks the truck body and brake support member against relative movement with respect to each other as long as the front bumper is in engagement with an obstacle. A one-way clutch and brake construction is provided for this purpose in which a movable lock member is moved in response to the position of the front bumper to determine whether relative movement is prevented or permitted between the truck body and the brake support member.

According to a further feature of the invention, the interconnection between the tow pin, truck body and brake support member includes a tow pin housing which is somewhat vertically movable, a supporting member connecting the truck body and tow pin housing for normal angular upward and forward movement of the housing and tow pin, thereby tending to disengage the tow pin from the conveyor, in response to the driving force exerted by the conveyor, all in combination with interengaging portions which connect the brake support member and one of the tow pin and tow pin housing members in a manner suitable for holding the tow pin downwardly in driven engagement with the conveyor whenever the brake support member is in its relative forward position and the front bumper is free of engagement with any obstacle. This interengaging means has a shape and construction disengaging the tow pin and tow pin housing members in response to engagement of the front bumper with such an obstacle and initial relative forward movement of the truck body with reference to the brake support member. Thus the tow pin is automatically disengaged from the conveyor whenever the truck body moves relatively forwardly for engagment of its wheel onto the brake member.

This same interconnection includes interengaging surfaces connecting the brake support member and one of the tow pin and tow pin housing members for holding the tow pin upwardly in non-driving position whenever the relative longitudinal position of the truck body and brake support member are such as to hold the truck wheel fully on its brake member.

Finally, the invention contemplates improved latching arrangements for a movable rear bumper for such a tow line conveyor truck, in which the rear bumper is normally and resiliently urged to a rearwardly projecting position and is locked in that position by a latching mechanism, which is automatically released in response to relative movement of the brake support member with respect to the truck body into a position at which the truck wheel rolls onto its brake member. The latched bumper is resiliently movable to a slight degree.

BRIEF DESCRIPTION OF THE DRAWINGS

In the accompanying drawings, which form a part of this application, and in which like reference characters indicate like parts, FIG. 1 is a side elevation of an improved tow line conveyor truck embodying a brake system according to the present invention, with the parts shown in their ordinary running or non-braking position;

FIG. 2 is a view similar to FIG. 1 which shows the tow line conveyor truck in fully braked position, after engagement with an obstacle in front of the truck;

FIG. 3 is a top view of the device of FIGS. 1 and 2, with the parts shown in the running position of FIG. 1, and with certain portions, including the top deck, broken away for clearness;

FIG. 4 is a sectional view on the line 4—4 of FIG. 3, showing in detail an anti-friction bearing for a longitudinally movable brake support member according to the invention;

FIG. 5 is an enlarged partial view of a portion of FIG. 3 showing details of an improved anti-back-up device for interlocking the truck body and brake support member according to the invention, with the parts in the normal running position of FIG. 1; and FIG. 6 is a view similar to FIG. 5 showing the position of the improved anti-back-up mechanism, when the parts are in the braking position of FIG. 2.

DESCRIPTION OF THE PREFERRED EMBODIMENTS

As shown in FIG. 1, a tow line conveyor truck 10 has a main load-carrying platform 11 supported by a rectangular body frame 12 to which it may be connected by rear and front supporting members 13 and 14. The main body frame also includes a plurality of cross members, including a front cross member 16, which may also serve as a push-off front bumper, wheel-supporting cross beams 17 and 18, and a rear cross member 19. The main body frame of the truck also includes two laterally spaced, longitudinally extending fixed beam portions 21, which cooperate to provide the necessary strength and rigidity of the main truck frame and to provide mounting areas for some of the parts of the tow truck assembly.

Front and rear wheels 22 and 23 are mounted on the truck body beneath the main body frame by appropriate brackets connected to the frame. Front wheels 22 are customarily mounted on caster brackets 24, which are adapted for pivotal movement on a vertical axis, so that the front of the truck can readily follow the desired path determined by a tow line conveyor 26, which is usually mounted beneath the level of a floor 27 on which the truck is designed to operate. Overhead conveyor lines may be used, however, in some cases.

Such a tow line conveyor 26 includes a plurality of pushing lugs 28 adapted for engagement with the lower end 29 of a tow pin 31 generally mounted at the front of such a truck. In this case the tow pin 31 is supported in a particular manner for relative vertical movement between a lower driven position in which end 29 can be pushed by lugs 28, and at least one upper non-driving position, in which the tow pin end 29 will be spaced above conveyor lugs 28, as shown in FIG. 2, but will still extend below the floor level 27 to maintain the truck in the desired path.

In this particular case, tow pin 31 is vertically slidable within a support housing 32 carried at the lower ends of one or more supporting brackets 33 which are inclined downwardly and forwardly from a common horizontal transverse pivot 34 on the central frame members 21 of the main truck body. The angular inclination of supporting arm 33 thus positions the tow pin 31 as shown in FIG. 1 in such a manner that the normal conveying force applied by lug 28 to the lower end 29 of the tow pin not only tends to push the tow pin horizontally along the path of conveyor 27, but also tends to lift the tow pin and its housing 32. During normal operation, as shown in FIG. 1, however, this tendency to lift tow pin 31 is resisted by the engagement of a cross pin 36 which projects laterally from housing 32 and bracket arms 33 into one end of a pair of cam slots 37 defined by cam edges 38 secured in fixed position on two longitudinally movable side edge members 39 and 41, which constitute parts of a movable brake and bumper support member according to the invention, designated generally at 42. This brake support member 42, as in the earlier copending patent application referred to above, is designed for relative forward and rearward movement with respect to the main truck body and is supported for this purpose in the present case by improved anti-friction bearings 43, 44, 46 and 47, the details of which are further shown in FIGS. 3 and 4. Thus, in FIG. 3, anti-friction bearing 43 engages the outer edge 48 of the longitudinal brake support member bar 39, which is provided at this location with an angular edge portion as shown particularly in FIG. 4. This angular edge portion includes an extreme lateral edge 49 at which two inclined surfaces 51 and 52 meet each other at substantially right angles. Upper surface 51 is inclined downwardly and outwardly to point 49, while lower edge surface 52 is inclined upwardly and outwardly to edge 49.

As furhter shown in FIG. 4, the improved anti-friction bearing of the invention includes a correspondingly oriented bearing support portion 53 which has an upper inclined bearing support area 54 generally parallel to surface 51. This support bearing portion 54 is welded or otherwise secured at 56 to a bracket or plate 57 on one of the cross frame members, such as 17, of the main truck body frame.

This fixed anti-friction bearing support 53 also includes a lower inclined portion 58, generally parallel to the surface 52 of the brake support member, which also serves as a front bumper support member.

Between these respective bearing surfaces, the present invention provides a suitable cage or raceway 59 provided with appropriate slots to receive one or more upper and lower roller bearing members 61 and 62 respectively. This particular bearing arrangement, including the angular bearing support surfaces on both the brake support member and the main truck body, as well as the intermediate anti-friction rollers 61 and 62, and the particular angles of inclination of these members, in effect provide a floating support for minimizing the frictional interengagement between the longitudinally movable brake support member 42 and the main truck body frame. By providing a "frictionless" or low friction bearing arrangement for convenient relative movement of these parts, the desired braking effect of the improved tow line conveyor truck according to this invention can be achieved with minimal transmission of forces to an obstacle ahead of the truck, as will be further described herein. It will be understood that the roller bearing members 61 and 62 which are guided for rolling movement between the respective bearing surfaces by the cage or raceway 59 may be replaced in certain cases, if desired, by appropriate ball bearings to provide an equivalent low friction or anti-friction mounting for the brake support member.

As shown in the normal running position of FIG. 2, the relatively movable brake support member is in its forward position with respect to the truck body and thus supports a pair of brake members 63 slightly in front of the respective rear truck wheels 23, which are rotatably supported by the usual fixed brackets 64 carried by the main truck body frame. Brake members 63, like the similar brake members described in the aforesaid copending application, are thus carried initially in a non-braking of forwardly retracted position just ahead of the rear wheels and close to the surface 27 of the supporting floor. Each brake member is pivoted at 66 to a cross beam 70 carried by two supporting arms 67, which extend longitudinally and angularly outwardly from pivotal connections 68 to the bars 39 and 41 of brake support member 42. A vertical spring 69 holds the brake member 63 and its supporting bar 70 just above the floor and against a suitable stop, so that brake member 63 will not engage the floor surface itself, until the brake is activated by some obstacle ahead of the truck.

A front bumper member 71 is pivotally mounted at the front end of the brake support member 42 for tilting movement on a transverse axis 72. When there is no obstacle in front of the truck, front bumper 71 is urged to the slightly inclined position shown in FIG. 1 by a compression spring 73 engaged between a bracket 74 fixed to brake support frame member 41 and a suitable washer 76 fixed to a connecting or control shaft 77 which extends forwardly and is pivoted at 78 to the lower portion of front bumper 71.

In this position of the parts, the cross pin 36 of the tow pin assembly is held downwardly by a retaining surface 79 of cam 37, 38.

When the front bumper 71 encounters an obstacle 81, however, as illustrated in FIG. 2, the front bumper 71 will first be rocked to a more vertical position, thus driving control shaft 77 relatively to the rear. At the same time, since the entire brake support member 42 is relatively free to move within the anti-friction bearings 43, 44, 46 and 47, the entire member 42 moves to the rear as shown in FIG. 2 and permits the tow pin retaining cross member 36 to slip out from under the cam surface 79, so that the force of engagement between the lug 28 of the conveyor and the lower end 29 of the tow pin tends to urge the tow pin and its housing upwardly with respect to their supporting pivots 34. This lifting movement can be enhanced, and the tow pin can be retained in its upper non-driving position, as shown in FIG. 2, by an appropriate further retaining surface 82 on the lower forward portion of cam 38. Actually, as shown in FIGS. 1 and 2, the relative length of the tow pin retaining cam surface 79 is relatively short, so that the tow pin can be released and lifted to non-driving position during the initial rearward movement of the brake support member 42, i.e., shortly after this brake support member leaves the relative position shown in FIG. 1, and well before the time in which it reaches the relative position of FIG. 2. In any event, once the obstacle which engages front bumper 71 has arrested the forward movement of brake support member 42 and has released the tow pin, then the main truck body and its rear wheels 23 are free to move forward relatively with respect to the brake support member 42, until the rear wheels actually move up onto the upper wheel engaging surfaces 87 of the brake members and thus press the lower floor engaging surfaces 88 of each brake member 63 firmly between the wheel and the supporting floor. Thus, the brake member will be held in position by that portion of the truck weight which is carried by each of the respective wheels 23. As described in the aforesaid copending application, brake members 63 are preferably inclined upwardly in order to lift the wheel members and truck and load, and thereby take advantage of the work performed in lifting these parts to stop the forward movement of the main truck body, without imposing additional substantial forces on the obstacle 81.

During this relative movement from the position of FIG. 1 to the position of FIG. 2, the springs 83, which are connected at one end to supports 84 fixed on the body frame members 21 and at their other ends to brackets 86 on the brake support member 42, will be stretched slightly to accommodate the forward overrunning movement of the truck body. These same springs 83 would accordingly tend to urge the parts resiliently back from the position of FIG. 2 to the position of FIG. 1, without the provision of an appropriate anti-back-up device, one form of which is described in the earlier identified copending application. In the improved combination of the present application, the anti-back-up device takes the preferred form of a specific interlock between the brake support member 42 and the main truck body.

For this purpose, the bracket member 74 (See FIGS. 3, 5 and 6) constitutes part of a C-shaped supporting bracket which includes a longitudinal extending base portion 89 and a second bracket arm 91 projecting generally parallel to the bracket arm 74. Projections 92 on the bracket base 89 facilitate the attachment of the bracket firmly, as by welding, to the longitudinally extending member 41 of the brake support member assembly 42.

A shaft 93 extends longitudinally through openings 94 and 96 in the respective bracket arms 74 and 91, as particularly shown in FIGS. 3, 5 and 6. This longitudinal shaft portion 93 is thus supported for sliding movement longitudinally of the truck and has its forward end secured at 97 to a transverse pin carried by a bracket 98 firmly secured to one of the cross frame members or battens 17 of the main truck body. Thus, shaft 93 will move longitudinally at all times as a unit with the main truck body portion, while bracket arms 74 and 91 and their associated parts will move at all times longitudinally as a unit with the brake support member assembly.

In order to provide for selective locking of these parts against movement, on the one hand, and selective release of the parts to permit longitudinal movement, on the other hand, a tilting lock washer 99 has one edge 101 retained in a fixed longitudinal location by projections 102 and 103 on bracket portion 89. The other end 104 of this tilting locking member 99 has an opening 106 through which the shaft 77 from front bumper 71 passes. A head or stop 107 on the end of shaft 77 limits the leftward movement of the end 104 of locking member 99, as shown in FIG. 5. The tilting lock 99 has its end 104 urged to the left in FIG. 5 by a spring 108 secured at 109 to the locking member 99 and secured at 111 to the bracket arm 91.

Locking member 99 has a locking opening 112 through which shaft 93 passes, and within which shaft 93 is longitudinally freely movable, whenever the lock 99 is in the normal untilted position of FIGS. 1, 3 and 5. In this position the diameter of the opening 112 is just sufficiently greater than the diameter of shaft 93 to permit free longitudinal movements.

As soon as the front bumper 71, however, is moved from its normal operating position of FIG. 1 to its activated or obstacle-engaging position of FIG. 2, shaft 77 moves to the left from the position shown in FIG. 5 to the position shown in FIG. 6.

Movement of connecting link or shaft 77 to the left from the position of FIG. 5 to the position of FIG. 6 moves its head 107 away from the end 104 of the tilting locking member 99, and permits spring 108 to tilt member 99 to the position of FIG. 6, which is determined by the diameter of opening 112 and the engagement of locking edges 113 and 114 of that opening with the periphery of the shaft 93. These parts are so dimensioned that the head 107 of shaft 77 is spaced to the left (as viewed in FIG. 6) of the end 104 of locking member 99 by a definite interval shown by the arrow 116, for a purpose to be described. During this movement of shaft 77 to the left spring 73 is also further compressed between washer 76 and bracket 74. A floating washer 117 may be interposed on shaft 77 between spring 73 and bracket arm 74.

With the parts in the position of FIG. 6, the angular arrangement of locking member 99 will permit relative movement of shaft 93 from left to right, i.e., in a relative longitudinal direction such that the main truck body can move from the normal running position of FIG. 1 to the braked position of FIG. 2, while the brake supporting assembly 42 remains essentially stationary by virtue of the engagement of its front bumper 71 with obstacle 81.

As the truck is coming to the stopped position of FIG. 2, however, the angular position of locking member 99, as shown in FIG. 6, and the biting engagement of locking edges 113 and 114 on shaft 93 under the influence of spring 108, are sufficient to prevent return movement of shaft 93 and the main truck body in a rearward direction, i.e., to the left as viewed in FIG. 2. Thus, any tendency of the truck to roll backward off the braking member 63, before obstacle 81 is removed from the front of the truck, is fully resisted by the firm and fixed interlocking engagement provided by this anti-back-up device. In the absence of such a device, the truck body could roll backwardly, and the relative movement of the parts could even cause re-engagement of the tow pin end 29 with the next-arriving driving lug 28 of conveyor 26, before the obstacle 81 was actually removed.

As soon as the obstacle is remvoed, however, the compression of spring 73 urges shaft 77 forwardly. An important feature of this arrangement is the space 116 which provides a lost motion connection between the end 107 of shaft 77 and the end 104 of the locking member. Thus, even if the locking edges 113 and 114 have bitten into the shaft 93 to some degree, spring 73 can urge shaft 77 fowardly and thus not only rock the front bumper 71 from its activated position of FIG. 2 to its normal running position of FIG. 1, but also provide a hammer-like blow against end 104 of locking member 99, as shaft 77 picks up the necessary velocity through the lost motion space 116. At this point, the truck body and brake member tend to be restored from their braked position of FIG. 2 to their normal running position of FIG. 1, both by the urging of springs 83 which connect these two parts, and also by the tendency of wheels 23 to move downwardly off the inclined upper surfaces 87 of brake members 63.

As described in the previously in the previously copending application, this type of truck assembly can also be provided with appropriate rear bumper portions which can either accommodate the relative movement from the position of FIG. 2 to that of FIG. 1 even when a following truck is engaged behind the leading truck, or, in appropriate circumstances, can provide a positive pushing action by which a following truck can push a leading truck when there is no obstacle in front of the latter.

For example, the brake support 42 may carry a transverse bumper 118 at its rear end for possible engagement by the front bumper 71 of a following truck, so that each following truck will be stopped, if there is an obstacle in front of the first truck. This rear bumper 118 forms part of the relatively rigid brake support member or assembly 42, which consists largely of the two longitudinal members 39 and 41, with appropriate cross members 119 and diagonal reinforcing members 121 and 122.

It is also possible to provide a rear pushing bumper 123 for engagement by the fixed front bumper 16 of a following truck in the manner described in the above identified copending application. In this case, rear bumper 123 is carried by a longitudinal shaft 124 supported in suitable cross brackets, such as 126, on the main truck body frame portion. A spring member 127 compressed between supporting bracket 126 and a washer 128 fixed to shaft 124 resiliently urges bumper 123 to its rearward position, as shown in FIGS. 1 and 3. According to an improved feature of the present combination, the bumper 123 is normally locked in this position by a gravity operated latch member 129 which is supported by a transverse pivot 131 secured to one of the truck body frame members. Latch member 129 has a rear locking edge 132 which drops into or otherwise engages a latching notch or shoulder 133 on the bumper shaft 124. Thus, when latch member 129 is in its lowered position as shown in FIGS. 1 and 3, the shaft 124 of bumper 123 is locked against relative forward movement on the body, and any pushing forces which are transmitted to bumper 123 by the front bumper 16 of a following truck will serve to push the leading truck ahead. When a leading truck has been stopped, however, and moved into braked position as in FIG. 2, the relative forward movement of the main truck body causes a latching arm 134 secured to latch 129 to engage a latch release or lifting edge 136 on the brake support member 42 and thus lift latch member 129 on its pivotal support 131 to a sufficient degree to unlatch the bumper shaft 124. This will permit a following truck to engage bumper 123 and cause relative forward movement of this bumper against the resilience of spring 127, whenever the leading truck has been blocked by an obstacle as in FIG. 2. Once the obstacle has been removed, and the parts have been returned to the normal running position of FIG. 1, however, the latch member 129 can again drop into its locking position of FIG. 1 and 3 and prevent relative movement of bumper 123 for the purposes described.

According to still another feature of this invention, bumper 123 is mounted and/or latched in such a way as to provide a resilient member at a location which introduces a small or limited degree of resilience, when the bumper is forcibly engaged by a following or pushing truck. For this purpose, a resilient bearing member 138 is provided for the latch pivot at 131.

The tow line conveyor truck assembly described in the foregoing specification accordingly includes an improved combination of features which provide a variety of different possible tow line conveyor truck operations with maximum effectiveness, and with positive braking of such a truck with minimal application of forces to obstacles encountered by the truck. Such obstacles, of course, can include other trucks which have been stopped ahead of a particular truck, or the obstacle may be an inanimate object which has been inadvertently left along the path of the conveyor, or even a person who is working in the vicinity of such a conveyor and is not alert to the approach of such a truck.

The foregoing specification accordingly describes the nature and principles of the present invention and some of the constructions by which it may be put into effect, including the best mode presently contemplated for practicing the invention.

I claim:

1. An improved tow line conveyor truck comprising in combination a load-carrying truck body having front and rear supporting wheels for engagement with a supporting floor, a tow pin for driven engagement by a tow line conveyor to move the truck across the floor along a path defined by such a conveyor, mechanism supporting the tow pin on the truck for movement between a driving position for driven engagement by such conveyor and a retracted non-position, a brake support member constituting an assembly extending generally longitudinally of the truck body in a direction corresponding to the path of movement of the truck, a front bumper member mounted at the front of the brake support for engagement by an obstacle in front of the truck, an anti-friction bearing member having respective bearing portions on said truck body and brake support member with intermediate rotatable friction-reducing bearings between the respective bearing portions supporting said brake support and freely permitting relative longitudinal movement of the brake support member and truck body along said path between a forward brake support member position in which the front bumper projects ahead of the truck and a rear brake support member position in which the front bumper is retracted rearwardly with respect to the truck body and thereby stopping the forward movement of the brake support member in response to minimal force resulting from such engagement of the front bumper by an obstacle, said brake support member carrying at least one brake member having a bottom floor-engagable surface and a top wheel-engagable surface, the brake support member in its forward brake support position holding the brake member in front of and out of engagement with at least one truck wheel, and the brake support member when stopped by engagement of an obstacle with the front bumper also stopping said brake member and holding it in a relative rearward braking position in which said one truck wheel rolls up onto the brake member and is separated from the floor with that part of the truck weight carried by that wheel pressing the brake member against the floor, the tow pin, truck body and brake support member having an interconnection for moving the tow pin to non-driving position in response to initial relative movement of the truck and wheel toward the brake member, an anti-back-up device preventing premature relative movement of the wheel and truck longitudinally off the brake member, said front bumper being movably supported on said brake support member for movement thereon between a rest position and an active position in response to engagement by such an obstacle in front of the truck, and a connecting mechanism between the front bumper and the anti-back-up device for activating the latter while the front bumper is held in its active position and for releasing the anti-back-up device in response to movement of the front bumper back to its rest position on removal of such obstacle.

2. An improved tow line conveyor truck according to claim 1 in which said anti-back-up device includes a releasable one-way clutch and brake device having first and second relatively movable portions, the first of which is secured to a portion of the truck body other than the wheel and the second of which is secured to the longitudinally movable brake support, said one-way clutch and brake device having a movable locking member operatively connected to and operated by the front bumper, thereby positioning the locking member in a lock position, in response to movement of the front bumper to its active position, in which the one-way clutch and brake device permits continued relative forward movement of the truck body relative to the brake support member but prevents rearward movement of the truck body relative to the brake support member, and movement of the front bumper to its rest position moving said locking member to unlocked position in which the truck body is free to move rearwardly relative to the brake support member and brake.

3. An improved tow line truck according to claim 2 in which the first relatively movable member of the one-way clutch and brake is a longitudinally extending shaft, the second relatively movable member is a holder for a tiltable lock washer, and the locking member includes the washer and a spring holding the lock washer resiliently in its first position in which the shaft is movable only in a relative forward direction through the lock washer, and said locking member further includes a link connecting the lock washer and front bumper and tilting the lock washer to a second position in response to movement of the front bumper to its rest position, said link having a lost-motion connection with the lock washer, for insuring a desired force to swing the lock washer from its first to second position when the link finally engages the lock washer.

4. An improved tow line conveyor truck according to claim 1 in which the truck is designed for use with a tow line conveyor positioned beneath such floor, and the interconnection between the tow pin, truck body and brake support member comprises a somewhat vertically movable tow pin housing, a supporting member connecting the truck body and tow pin housing for normal angular upward and forward movement of the housing and tow pin thereby tending to disengage the tow pin from such conveyor in response to the driving force exerted along said path by engagement of the conveyor against the tow pin, and interengaging portions connecting the brake support member and one of the tow pin and tow pin housing members for holding the tow pin downwardly in driven engagement with the conveyor whenever the brake support member is in its relative forward position and the front bumper is free of engagement with any obstacle, said interengaging means having a shape and construction disengaging the tow pin and tow pin housing members in response to engagement of the front bumper with an obstacle and initial relative forward movement of the truck body with reference to the brake support member and thereby providing disengagement of the tow pin from the conveyor whenever the truck body moves relatively forwardly for engagement of said wheel onto said brake member.

5. An improved tow line conveyor truck according to claim 4 in which said interconnection between the tow pin, truck body and movable brake support member includes interengaging surfaces connecting said brake support member and one of said tow pin and tow pin housing members for holding the tow pin upwardly in non-driving position whenever the relative longitudinal position of the truck body and brake support member holds said wheel fully on said brake member.

6. An improved tow line conveyor truck according to calim 1 having a rear bumper mounted on the truck body for longitudinal movement between a rearwardly projecting position and a forwardly retracted position, spring means normally and resiliently urging said rear bumper from its forwardly retracted position toward its rearwardly projecting position, and latching mechanism for temporarily locking the rear bumper in its rearwardly projecting position, said latching mechanism including cooperating first and second latch portions located respectively on said rear bumper and on said truck body, at least one of said latch portions being normally urged into a first position in engagement with the other latch portion thereby locking the rear bumper in its rearwardly projecting position, and a latch releasing member on said brake support member having a relative location for engaging said one latch portion and moving said one latch portion into a second position out of engagement with the other latch portion in response to relative movement of the brake support member with respect to the truck body to a position at which said truck wheel rolls onto said brake member.

7. An improved tow line conveyor truck according to claim 6 in which the mounting of said rear bumper and its latching mechanism provides a resilient member at a location which introduces a limited degree of resilience, when the bumper is forcibly engaged by a following or pushing truck, even when said bumper is latched in rearwardly projecting position.

8. An improved tow line conveyor truck according to claim 7 in which said resilient member is a resilient supporting washer within which one of said latch portions is supported.

9. An improved tow line conveyor truck according to claim 7 in which said brake support member has two longitudinally extending outer edges with front and rear anti-friction bearing members for each edge, each such bearing member including angular upper and lower bearing suraces on the brake support member edge, with the upper bearing surface inclined outwardly and downwardly to an outer edge line and with the lower bearing surface inclined outwardly and upwardly to said outer edge line, the corresponding bearing surfaces on the truck body for each such bearing including similarity inclined upper and lower bearing surfaces spaced outwardly from and parallel to the corresponding surfaces at the brake support member edges, and such bearing having its intermediate rotatable bearing members positioned and guided by an angular bearing member cage spaced between the parallel to the corresponding inclined bearing surfaces of the brake support member and truck body.

10. An improved tow line conveyor truck comprising in combination a load-carrying truck body having front and rear supporting wheels for engagement with a supporting floor, a tow pin for driven engagement by a tow line conveyor to move the truck across the floor along a path defined by such a conveyor, mechanism supporting the tow pin on the truck for movement between a driving position for driven engagement by such conveyor conveyor and a retracted non-driving position, a front bumper support member extendng generally longitudinally of the truck body in a direction corresponding to the path of movement of the truck, a front bumper member mounted at the front of the bumper support for engagement by an obstacle in front of the truck, an anti-friction bearing member having respective bearing portions on said truck body and bumper support member with intermediate rotatable friction-reducing bearings between the respective bearing portions supporting said bumper support and freely permitting relative longitudinal movement of the bumper support member and truck body along said path between a forward position in which the front bumper projects ahead of the truck body and a rear position in which the front bumper is retracted rearwardly with respect to the truck body and thereby stopping the forward movement of the bumper support member in response to minimal force resulting from such engagement of the front bumper by an obstacle, the tow pin, truck body and bumper support member having an interconnection for moving the tow pin to non-driving position in response to initial relative movement of the truck and wheel toward the front bumper, the truck being designed for use with a tow line conveyor positioned beneath such floor, and the interconnection between the tow pin, truck body and bumper support member comprises a somewhat vertically movable tow pin housing, a supporting member connecting the truck body and tow pin housing for normal angular upward and forward movement of the housing and tow pin thereby tending to disengage the tow pin from such conveyor in response to the driving force exerted along said path by engagement of the conveyor against the tow pin, and interengaging portions connecting the bumper support member and one of the tow pin housing members for holding the tow pin downwardly in driven engagement with the conveyor whenever the bumper support member is in its relative forward position and the front bumper is free of engagement with any obstacle, said interengaging means having a shape and construction disengaging the tow pin and tow pin housing members in response to engagement of the front bumper with an obstacle and initial relative forward movement of the truck body with reference to the bumper support member and thereby providing disengagement of the tow pin from the conveyor whenever the bumper engages an obstacle and the truck body moves relatively forwardly with respect to said bumper support member.

* * * * *